United States Patent [19]

Auchapt et al.

[11] Patent Number: 4,464,341

[45] Date of Patent: Aug. 7, 1984

[54] VORTEX APPARATUS FOR THE CONTINUOUS PRODUCING OF A PRECIPITATE

[75] Inventors: Pierre Auchapt, Cité des Cyprès; Aimé Ferlay, Laudun, both of France

[73] Assignee: Commissariat a l'Energie Atomique, Paris, France

[21] Appl. No.: 403,021

[22] Filed: Jul. 29, 1982

[30] Foreign Application Priority Data

Aug. 12, 1981 [FR] France ................................. 81 15603

[51] Int. Cl.³ .............................. B01F 9/20; B01J 8/10; B01J 8/14
[52] U.S. Cl. .................................... 422/202; 209/199; 209/200; 210/512.1; 210/512.3; 366/165; 422/209; 422/225; 422/226; 422/228; 422/271; 422/272
[58] Field of Search .............. 422/209, 225, 226, 227, 422/228, 229, 230, 159, 271, 272, 202; 366/165; 209/199, 200; 210/512.1, 512.3

[56] References Cited

U.S. PATENT DOCUMENTS 2,685,499 8/1954 Hood .................................. 422/225

FOREIGN PATENT DOCUMENTS 909958 5/1946 France .
2080117 11/1971 France .

Primary Examiner—Barry S. Richman
Assistant Examiner—William R. Johnson
Attorney, Agent, or Firm—Michael N. Meller

[57] ABSTRACT

Vortex apparatus for the continuous production of a precipitate by reacting together at least two reactants wherein it comprises a rotary bowl, having a vertical axis a fixed cylinder arranged coaxially within the bowl in order to define with the latter an annular raising chamber, thus providing a fluid flow connection with a reaction chamber defined within the fixed cylinder, reactant inlet pipes issuing into the upper part of the reaction chamber in the vicinity of the axis of the bowl, at least one weir fixed to the rotary bowl at the upper end of the raising chamber and a turbine fixed to the rotary bowl in the lower part of the reaction chamber, so as to produce a vortex in the latter and ensure the raising of part of the precipitate into the raising chamber.

8 Claims, 3 Drawing Figures

VORTEX APPARATUS FOR THE CONTINUOUS PRODUCING OF A PRECIPITATE

BACKGROUND OF THE INVENTION

The present invention relates to an apparatus for continuously producing a precipitate by reacting together at least two reactants. More specifically, the invention relates to a vortex apparatus, intended more particularly for producing precipitates which are particularly adhesive during their formation.

A precipitation apparatus is already known, which comprises a fixed cylindrical vessel having a vertical axis into which the reagents are continuously introduced at the top of the said vessel and in the vicinity of its axis. A stirrer formed by a magnetized bar is positioned on the bottom of the vessel. The rotation of this bar is controlled by a rotary magnetic field generator positioned below the bottom of the vessel. The rotation of the stirrer makes it possible to produce a vortex, which has the effect of stirring the mixture and removing the freshly formed precipitates from the walls. Thus, the precipitates, which are denser than the solution, form in the vicinity of the vessel axis and tend to become localized there. Thus, the precipitates age in the vicinity of the vessel axis before lightly touching the vessel walls and are discharged with the solution via an overflow formed in the upper part of the vessel. Heating means may have to be provided outside the vessel if made necessary by the chemical reaction.

Thus, in this known apparatus, the vortex has the effect of moving the freshly formed precipitates away from the supports, which prevents incrustation of the apparatus when the precipitates are particularly adhesive. However, this apparatus has a certain number of disadvantages. Thus, when the envisaged chemical reaction involves radioactive products, the limits imposed by the safety conditions significantly restrict the capacity of such an apparatus. The increase in the capacity consequently necessitates the arrangement in parallel of a plurality of such apparatus, which has the effect of complicating the division of the feeds and the collection from the overflows. Moreover, the friction of the stirrer on the bottom of the vessel leads to a relatively short service life of the apparatus, which can only be improved by equipping the stirrer and the bottom of the vessel with special coatings based on tetrafluoroethylene and stainless steel. The effect of such equipment is to significantly increase the cost of the precipitator and leads to a limited period of use. In addition, the direct discharge of the precipitate through an overflow formed in the fixed vessel is accompanied by a simultaneous discharge of the solution, which is explained by the fact that the precipitates are denser than the solution.

In addition, precipitation apparatus are known, which comprise two, coaxial, fixed, cylindrical channels having vertical axes into which the reagents are introduced via the upper part of the central channel. The mixture is stirred by means of a plurality of stirrers regularly distributed around a rotary shaft positioned in the central channel. The rotary shaft carries a bladed turbine beneath the lower orifice of the central tube. This turbine ensures the raising of the precipitate and the solution in the lateral channel up to an overflow provided in the upper part of the lateral channel. This apparatus functions discontinuously, because the velocity of the liquids in the lateral outlet channel would be too low to raise the precipitate up to the overflow. This would lead to the choking up of the apparatus. Moreover, the precipitates tend to form dense beds between the stirrers.

Finally, precipitation apparatus are known, which comprise two fixed, coaxial, cylindrical channels in which the mixture is stirred by means of a scraper, which rotates in the central channel and undergoes vertical shocks to ensure its cleaning. At the bottom of the central channel, the reagents are stirred by a turbine, which localizes a dense precipitate bed. The solution rises in the lateral channel and is then discharged through an overflow. During its rise, the solution is purified of the precipitate, which settles and passes through the dense bed to be received at the base of the apparatus. Although this apparatus functions continuously, it does not permit a very high flow rate, because the increase in the flow rate helps to bring about the incrustation of the scraper. Moreover, in this solution, the precipitate must be raised at the outlet of the apparatus and it should be noted that the increase in the flow rate is also unfavourable to the raising of the precipitate.

BRIEF SUMMARY OF THE INVENTION

The object of the present invention is to provide a vortex apparatus, which is particularly intended for the continuous production of a relatively adhesive precipitate, although it is not limited thereto. This precipitator does not have the disadvantages of the prior art precipitators. Thus, the main object of the invention is the provision of a large capacity precipitator having a particularly long service life, whilst ensuring both the raising and the separation of the precipitates, although their density is higher than that of the solution, by carrying out a significant recycling of the solution and without affecting the precipitation time. The invention also relates to the provision of an apparatus in which the reagents present can be heated or cooled, if necessary, by means located within the very apparatus, which was not possible in the case of the prior art precipitators.

Thus, the present invention specifically relates to a vortex apparatus for the continuous production of a precipitate by reacting together at least two reactants, wherein it comprises a rotary bowl, having a vertical axis a fixed cylinder arranged coaxially within the bowl and being positioned with its bottom spaced from the bottom surface of the rotary bowl thereby defining an annular raising chamber and providing a fluid flow connection between the raising chamber and a reaction chamber defined within the cylinder, reactant inlet pipes issuing into the upper part of the reaction chamber in the vicinity of the axis of the bowl, at least one weir fixed to the rotary bowl at the upper end of the raising chamber and a turbine fixed to the rotary bowl in the lower part of the reaction chamber, so as to produce a vortex in the latter and ensure the raising of part of the precipitate into the raising chamber.

As a result of these features, it is apparent that the reaction chamber defined within the fixed cylinder of the apparatus according to the invention, behaves in substantially the same way as the chamber defined in the fixed vessel of the prior art vortex precipitation apparatus. However, the presence of a bowl rotating outside the fixed cylinder makes it possible to produce a centrifugal effect in the annular chamber defined between the bowl and the cylinder. This effect tends to agglomerate the precipitates which are denser than the solution outside the said space and only the solution is in contact with the outer wall of the fixed cylinder. This contact has the effect of breaking the liquid and making it drop again along the said wall. This recycling of the liquid permits the raising of the precipitate, whilst creating an upward stream on the outer periphery of the annular space. By accelerating the rotation of the rotary bowl, it is even possible to almost completely empty the apparatus.

Preferably, the blades of the turbine fixed to the bottom of the rotary bowl comprise a portion located above the lower end of the cylinder, so as to ensure a recycling of part of the precipitate into the reaction chamber, and a part located below the lower end of the cylinder, in such a way as to ensure the raising of part of the precipitate into the raising chamber.

In practice, the vortex apparatus according to the invention preferably comprises an outer enclosure integral with the fixed cylinder and supporting the rotary bowl, as well as means for driving the latter in a rotary manner. The outer enclosure comprises an annular collector into which the weir issues and an outlet pipe communicating with the collector. In the hypothesis that the products treated in the precipitator are radioactive products, this enclosure can also provide the neutron insulation of the apparatus.

According to a preferred embodiment of the invention, the fixed cylinder has recesses which receive the heating means, cooling means and/or control means. These heating, cooling and control operations can therefore be carried out directly within the solution and not outside the apparatus, as is generally the case in the prior art apparatus.

According to a secondary feature of the invention, the outer face of the fixed cylinder can be provided with ribs downwardly channeling the liquid which descends into the raising chamber in the vicinity of the cylinder as a result of the deceleration caused by the latter being stationary.

In order to accelerate the raising of the precipitate, the inner face of the rotary bowl is preferably upwardly divergent. In practice, the inner face of the rotary bowl can in its lower part form an angle in excess of 7° with the vertical, and over the remainder of its height an angle of approximately 1° with the vertical.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
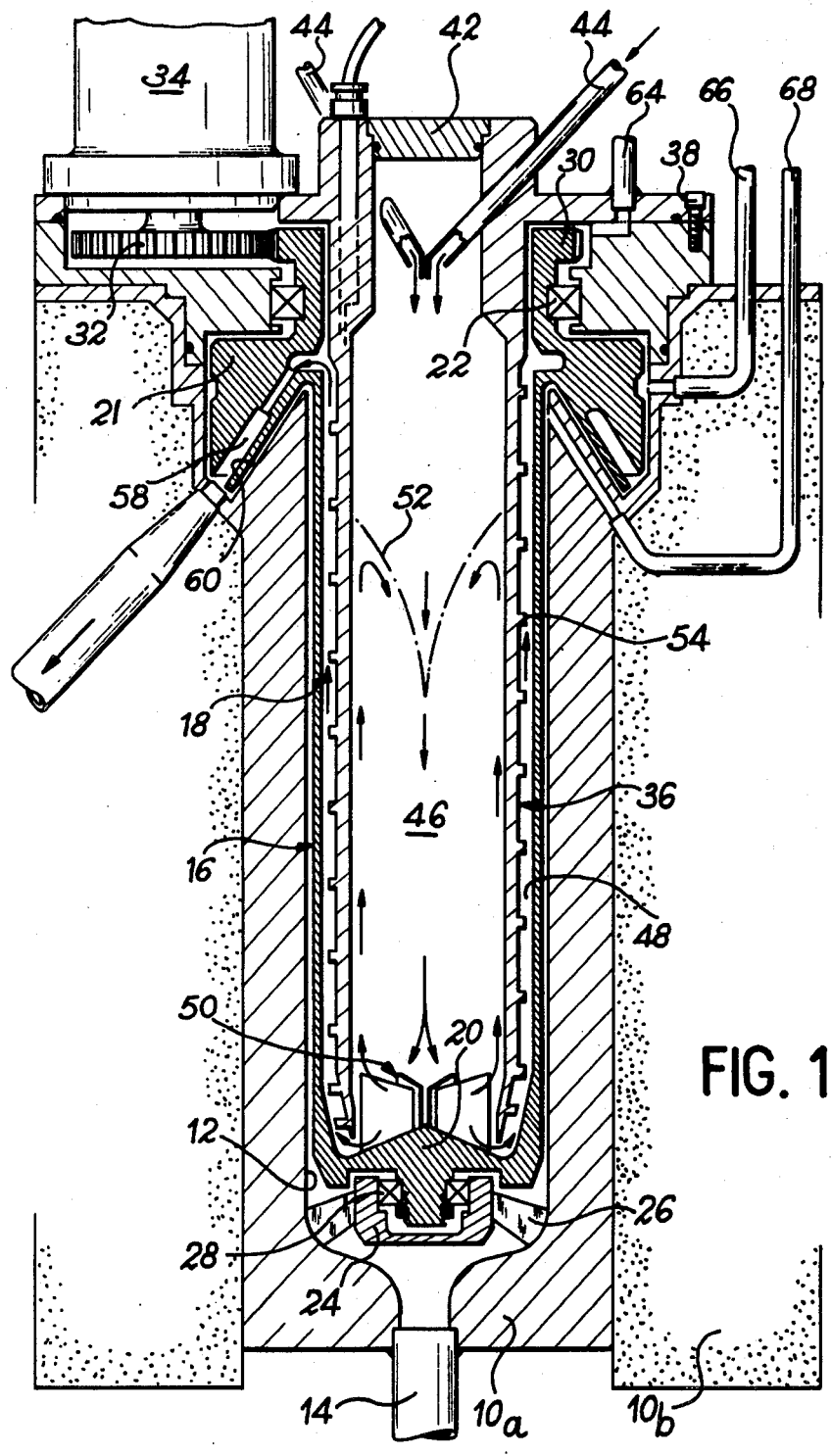
FIG. 1 a diagrammatic sectional view of a vortex precipitation apparatus according to the invention.

The apparatus shown in the drawings is particularly suitable for the production of a precipitate in a radioactive medium. To this end, it comprises an enclosure in several parts 10a, 10b, said parts being respectively made from boron carbide and polythene in order to insulate the bowl from α-particles and neutrons. The inner part 10a of the enclosure defines a cavity 12 having a cylindrical configuration with a vertical axis. The cavity is extended at its lower end by a purge opening 14. A rotary bowl 16 is arranged coaxially within cavity 12. Bowl 16 has a lateral wall 18 and a bottom 20. Lateral wall 18 is extended upwards by a widened portion 21 mounted in rotary manner in part 10a by means of at least one bearing 22.

In the represented embodiment, there is only one bearing 22 and bottom 20 of bowl 16 is extended downwards so as to be received in rotary manner by means of a second bearing 28 in a nacelle 24 joined to enclosure 10a by fins 26. According to another not shown embodiment, bearing 28, as well as nacelle 24 can be eliminated in which case bearing 22 is duplicated. However, this solution has the disadvantage that it requires balancing of the bowl.

Figure 2:
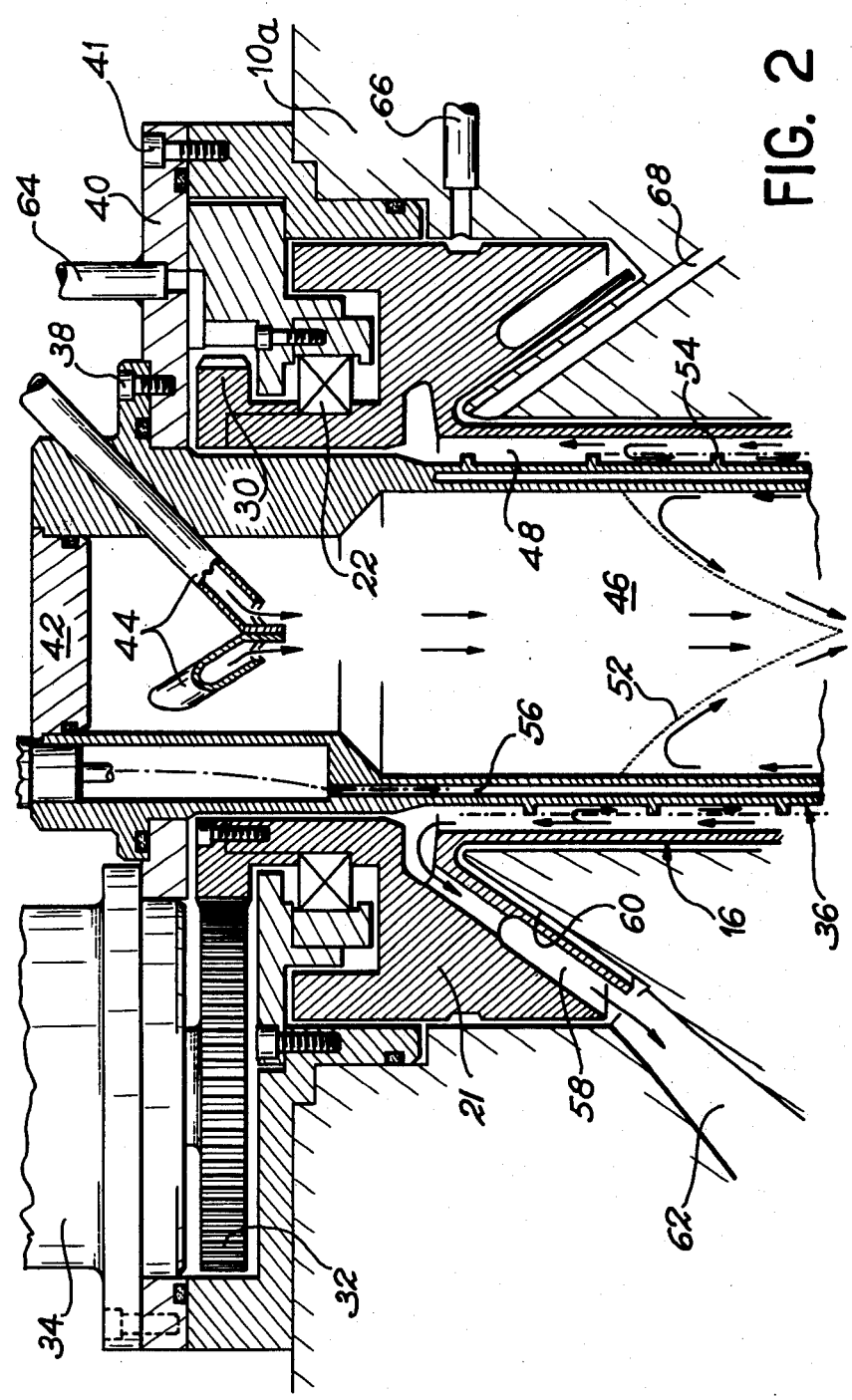
FIG. 2 a larger scale sectional view of the upper part of the apparatus of FIG. 1.

It can be seen in FIGS. 1 and 2 that the upper part 21 of bowl also defines a spur ring 30 which meshes with a pinion 32, whose vertical axis is parallel to the axis of bowl 16. The spindle of pinion 32 is rotated by a motor 34 fixed to the apparatus enclosure.

A hollow cylinder 36 is fixed, for example, by screws 38 to the upper end of the enclosure, which is coaxial to bowl 16. These screws 38 pass through a flange 40 covering the upper end 21 of bowl 16 and is then fixed by screws 41 to enclosure 10. The upper end of hollow cylinder 36 is sealed by a plug 42. Oblique supplied pipes 44 pass through the side wall of cylinder 36 and issue into the interior and at the upper end of the latter in the vicinity of its vertical axis.

As is shown in the drawings, the fixed cylinder 36 extends over most of the length of the rotary bowl 16 and ends in the vicinity of bottom 20. Thus, a reaction chamber 46 is defined within the fixed cylinder 36 and an annular raising chamber 48 is defined between the rotary bowl 18 and the fixed cylinder 36. These chambers are linked by a passage 49 between the lower end of cylinder 36 and bottom 20 of the rotary bowl.

In order to stir the mixture in reaction chamber 36 and assist the raising of the precipitate into annular chamber 48, bottom 20 of the rotary bowl 16 carries a turbine 50 constituted by blades arranged in vertical planes and radially with respect to the axis of the bowl and the vessel. More specifically, it can be seen that the blades of turbine 50 have a portion located above the lower end of fixed cylinder 36 and a portion located below said end. Thus, turbine 50 ensures the production of a vortex diagrammatically represented at 52 in FIGS. 1 and 2 in reaction chamber 46. Moreover, turbine 50 makes it possible to eject part of the mixture into annular chamber 48.

In order to facilitate the discharge of the precipitate towards annular chamber 48, the inner wall of bottom 20 of rotary bowl 16 is shaped like a cone whose apex is directed upwards. Moreover, the raising of the precipitate into annular chamber 48 is facilitated by the fact that the inner part of side wall 18 of rotary bowl 16 is slightly upwardly divergent. More specifically, the inner part of said wall is inclined relative to the vertical by an angle exceeding 7° over a height substantially equal to the height of turbine 50. The slope of the remainder of the wall is less and is preferably approximately 1°. This limited slope is justified both by the fact that the raising of the precipitate into annular chamber 48 is not due solely to this feature, as will be described hereinafter, and by the fact that a greater slope would increase the overall dimensions of the precipitator under conditions not satisfactory particularly from the standpoint of safety when the treated reactants have a radioactive nature.

In order to facilitate the recycling of the solution constituting, as will be shown hereinafter, the main element ensuring the raising of the precipitate into annular chamber 48, the outer surface of fixed cylinder 36 can be provided over its entire length with a helical rib 54 channeling the downward path of the solution along the said surface.

The chemical precipitation reaction taking place within the apparatus may require either heating or cooling of the reagents. It may also be necessary to control the reaction by means of appropriate probes. To this end and as is more particularly illustrated by FIGS. 2 and 3, recesses 56 are formed over the entire height of fixed cylinder 36, e.g. by providing the latter with a double wall. In addition to the cooling means, electrical heating resistors and control probes, recesses 56 can also be used to house discharge piping or neutrophage material when the nature of the reagents justifies it.

As shown in FIGS. 1 and 2, the upper end of annular chamber 48 forms an overflow issuing into weirs 58 formed in the divergent portion 21 of rotary bowl 16 and whereof only one is shown in the drawing. The lower end of these weirs issues into an annular collector 60 formed in part 10a of the outer enclosure. This annular collector 60 has a V-shaped section and its bottom is provided with at least one discharge pipe 62 traversing the outer enclosure for moving the precipitate formed outside the apparatus.

Finally, pipes 54, 66 and 68 pass through different parts of the enclosure in order to issue respectively into the space containing the spur ring 30, in the upper part of the annular collector 60 and at the upper end of the annular space defined between rotary bowl 16 and the outer enclosure. These pipes are used for the cleaning and decontamination of the apparatus, when it is used for treating radioactive reactants.

Figure 3:
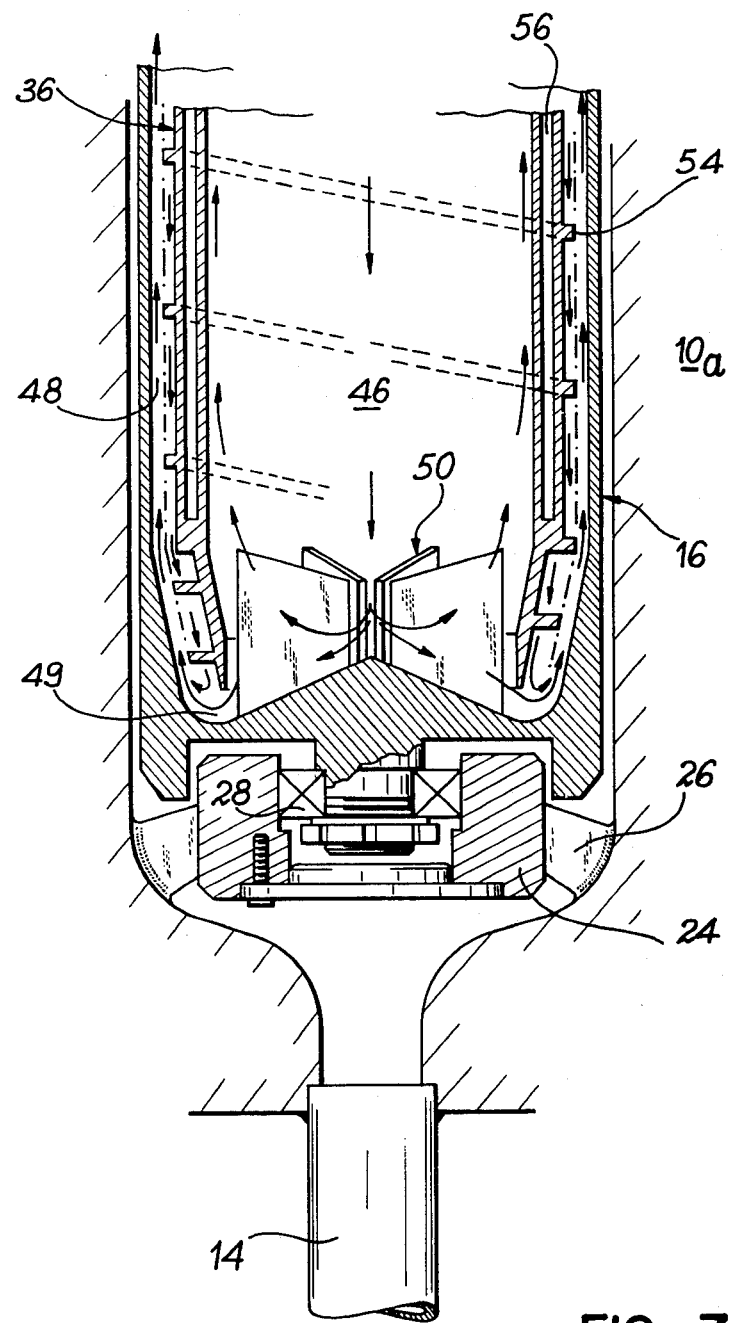
FIG. 3 a larger scale sectional view of the lower part of the apparatus of FIG. 1.

The apparatus described hereinbefore with reference to FIGS. 1 to 3 functions in the following way.

Each of the reactants is introduced into the upper end of reaction chamber 48 and in the vicinity of its axis by means of one of the intake pipes 44. This introduction takes place continuously. The rotation of bowl 16 and turbine 50 has the effect of creating a vortex, diagrammatically represented at 52. This vortex ensures the mixing of the reactants and the passage of the precipitate formed towards the bottom and in accordance with the axis of the apparatus, in the manner shown by the arrows in FIG. 1. The freshly formed precipitate is consequently moved away from the walls for a sufficient time to ensure its ageing. As this ageing is accompanied by a significant decrease in the adhesion of the precipitate, the latter has become relatively slightly adhesive by the time it becomes level with turbine 50. At this level, it can be seen in FIGS. 1 and 3 that part of the precipitate rises with the solution into chamber 46 along the inner wall of fixed cylinder 36 before redescending again along the axis under the effect of the vortex, as illustrated by the arrows. Another part of the precipitate and of the solution is laterally discharged by turbine 50 into passage 49 and then into annular chamber 48. As a result of the slight slope of the inner face of side wall 18 of rotary bowl 16, the radial force to which the precipitate is exposed under the action of turbine 50 gives rise to an upwardly directed vertical component, which tends to raise the precipitate along the said wall. Moreover, the rotation of bowl 16 subjects the dissolved precipitate to a centrifugal force, which tends to engage the precipitate, which is denser than the solution, with the inner face of wall 18 of the rotary bowl. Thus, the solution is localized in the part of the annular space 48 closest to the outer face of fixed cylinder 46. The stationary nature of the latter leads to the deceleration of the solution, which redescends along cylinder 36 under the effect of gravity forces. This descent of the solution is channeled by the helical rib 54. To this end, rib 54 preferably has a left-hand pitch when the rotation direction of rotary bowl 16 is the trigonometric direction corresponding to the direction of the natural vortex. This descent of the solution along the outer face of fixed cylinder 36 ensures a looped circulation of the liquids in annular space 48, as shown by the arrows in FIGS. 2 and 3. Thus, this looped circulation ensures the raising of the precipitate into space 48. In addition, this circulation also has the effect of cleaning the walls and reducing the static charge created by the rotation of the bowl. Thus, the precipitate and only a small part of the solution are discharged by weirs 58, which rotate with bowl 16. The precipitate then drops into fixed collector 60, from where it is discharged towards the outside of the apparatus by means of pipe 62. As the latter is positioned in the upper part of the apparatus, it is not necessary to subsequently raise the precipitate.

In order that the vortex 52 correctly fulfils its function, the rotation speed of bowl 16 must exceed 200 r.p.m. Preferably, a speed between 250 and 400 r.p.m. is chosen.

When a precipitation cycle is finished and it is necessary to empty the apparatus, the rotation speed of bowl 16 is increased to approximately 1000 r.p.m. The precipitator is then almost completely emptied, as a result of the inclination of the inner wall of the bowl. This total emptying is facilitated by a change of the rotation direction (reversed as compared with the trigonometric direction), which adds the helical effect to the centrifugal effect.

When the precipitation reaction is carried out at a temperature differing from the ambient temperature, it has been seen that the necessary heater can be constituted by electrical resistors located in recesses 56 of the fixed cylinder. The temperature obtained can be regulated by thermocouples, which are also placed in recesses 56.

The above description has shown that the precipitator according to the invention has numerous advantages compared with the known vortex precipitator, whilst ensuring the raising of the precipitate and its separation from the solution.

What is claimed is:

1. A vortex apparatus for the continuous production of a precipitate by reacting together at least two reactants, which comprises a rotary bowl having a vertical axis, means for rotating the rotary bowl, a fixed cylinder arranged coaxially within the bowl, said fixed cylinder being positioned with the bottom thereof spaced from the bottom surface of said rotary bowl, thereby defining an annular raising chamber and providing a fluid-flow connection between said raising chamber and a reaction chamber defined within the fixed cylinder, reactant inlet pipes issuing into the upper part of the reaction chamber in the vicinity of the axis of the bowl, at least one weir fixed to the rotary bowl at the upper end of the raising chamber and a turbine fixed to the rotary bowl in the lower part of the reaction chamber, so as to produce a vortex in said reaction chamber and ensure the raising of part of the precipitate into the raising chamber.

2. A vortex apparatus according to claim 1, wherein the blades of the turbine comprise a portion located above the lower end of the cylinder, so as to ensure a recycling of part of the precipitate into the reaction chamber, and a portion located below the lower end of the cylinder, so as to ensure the raising of part of the precipitate into the raising chamber.

3. A vortex apparatus according to claim 1 or 2, wherein it also comprises an outer enclosure integral with the fixed cylinder and supporting the rotary bowl, wherein said means for rotating the rotary bowl is located on said outer enclosure, said outer enclosure incorporating an annular collector into which the weir issues and a discharge pipe operatively connected to said annular collector.

4. A vortex apparatus according to claim 1, wherein the fixed cylinder contains means defining recesses in which are received means for temperature alteration and control.

5. A vortex apparatus according to claim 1, wherein the outer face of the fixed cylinder is provided with a helical rib downwardly channeling a liquid which redescends in the raising chamber in the vicinity of the cylinder, as a result of the deceleration resulting from the stationary nature of the cylinder.

6. An apparatus according to claim 1, wherein the bottom surface of the rotary bowl is cone shaped and its apex is directed upwards.

7. A vortex apparatus according to claim 1, wherein the inner face of the rotary bowl is upwardly divergent so as to accelerate the raising of the precipitate.

8. A vortex apparatus according to claim 7, wherein the inner face of the rotary bowl forms, in the lower part thereof, an angle exceeding 7° with the vertical and, over the remainder of its height, an angle of approximately 1° with the vertical.

* * * * *